Figure 1:
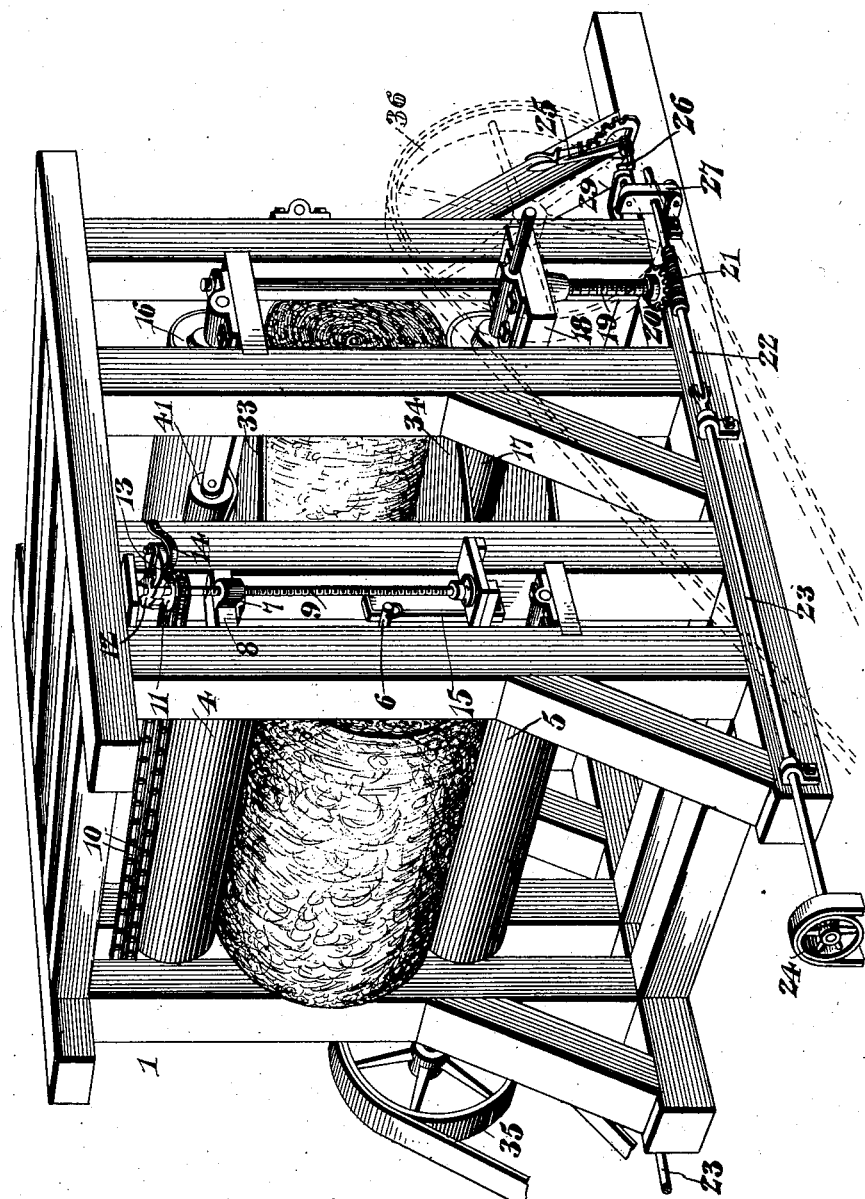

No. 703,470. Patented July 1, 1902.
H. REMBERT.
METHOD OF MAKING COTTON BALES.
(Application filed Mar. 19, 1901.)
(No Model.) 3 Sheets—Sheet 1.

Henry Rembert, Inventor

Witnesses

No. 703,470. Patented July 1, 1902.
H. REMBERT.
METHOD OF MAKING COTTON BALES.
(Application filed Mar. 19, 1901.)
(No Model.) 3 Sheets—Sheet 2.
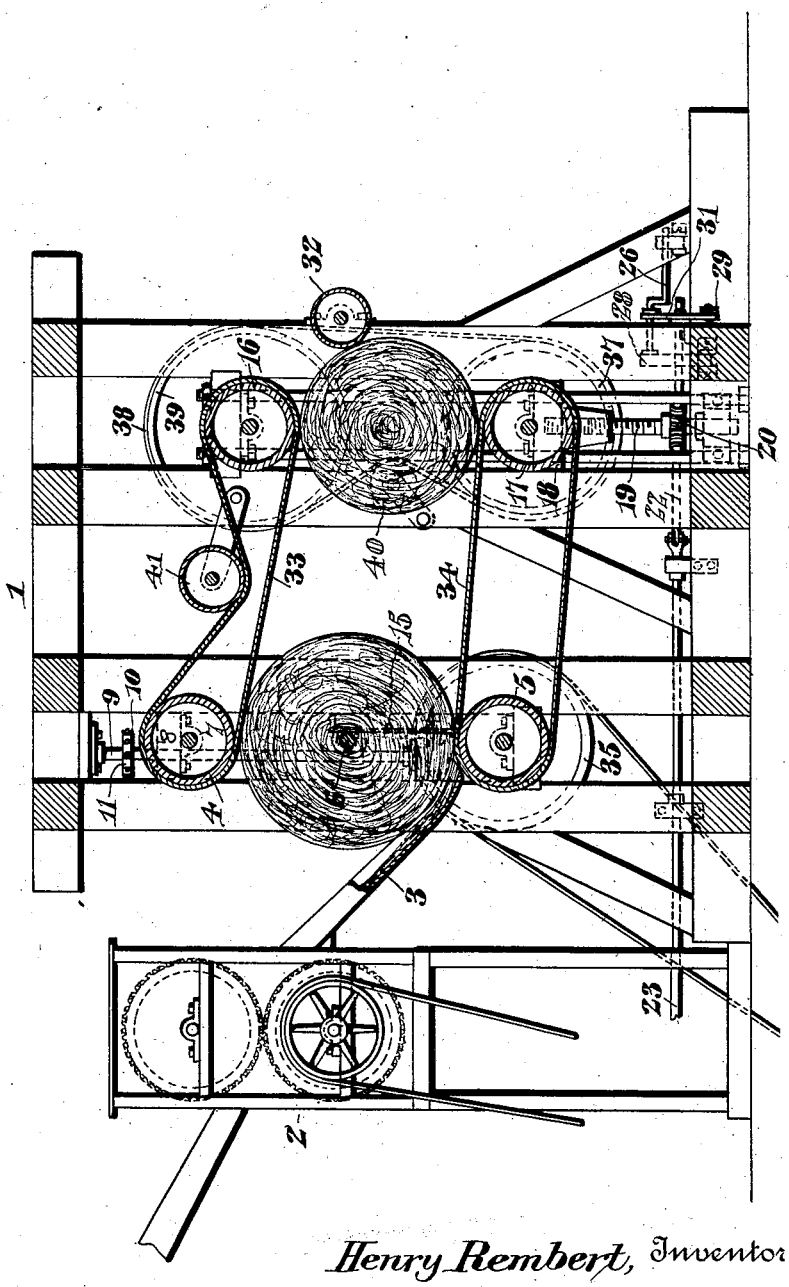
Henry Rembert, Inventor

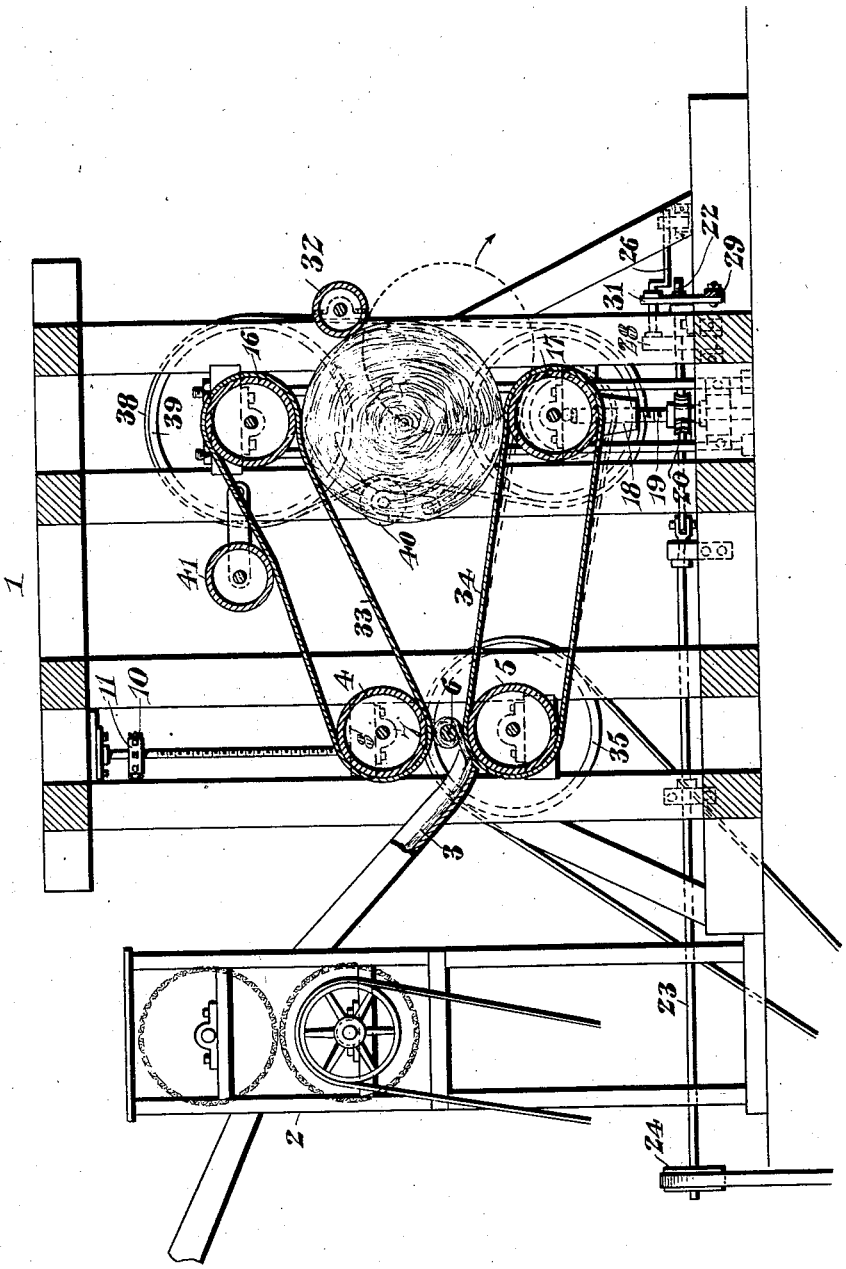

UNITED STATES PATENT OFFICE.

HENRY REMBERT, OF HOUSTON, TEXAS.

METHOD OF MAKING COTTON-BALES.

SPECIFICATION forming part of Letters Patent No. 703,470, dated July 1, 1902.

Application filed March 19, 1901. Serial No. 51,823. (No model.)

*To all whom it may concern:*

Be it known that I, HENRY REMBERT, a citizen of the United States, residing at Houston, in the county of Harris and State of Texas, have invented a new and useful Method of Making Cotton-Bales, of which the following is a specification.

My present invention relates to a novel method designed to be employed in the manufacture of cylindrical cotton-bales.

Considered in a broad aspect the process originated by me for the purpose of overcoming a number of objections urged against cylindrical bales now on the market involves the thought of forming a bale from a bat by winding the latter without appreciable compression in detail until a complete closely-wound bale is produced, said bale being then relieved of its core and subjected to great compression while being rotated, the result of such a process being what is known as a "compress bale" of uniform density and of perfect fiber.

In order that the advantages accruing from the practice of my process may be more readily apparent and the distinction between said process or method and the methods now employed in the making of cylindrical bales more readily understood, I shall describe briefly the most prominent or more distinct methods of cylindrical-bale making and will call attention to such objectionable results thereof as have induced the experiments eventuating in the subject-matter of this application.

In the art of cylindrical-bale making two principal methods have been adopted with more or less success. These methods are exemplified, respectively, in the patents to J. W. Graves, No. 546,009, September 10, 1895, and G. A. Lowry, No. 630,369, August 8, 1899. The Graves method consists in winding a continuous sheet or bat around a spindle or core while being subject to continuous pressure—that is to say, the pressure is applied to the initial layer or convolution disposed upon the core and is constantly maintained during the winding of the bale to obtain detailed compression, by which is meant the compression of each individual portion of the bat as it is wound layer upon layer around the core.

For the purpose of carrying out this method a number of presses, differing more or less in detail, have been devised; but in each instance the cylindrical bale is formed between compression-rolls, which compress the bale in detail and which exert a pressure increasing as the diameter of the bale is increased by the winding thereon of the successive convolutions of the cotton-bat received from the condenser. A cylindrical bale produced by the Graves method is possessed of certain desirable characteristics, the principal of which is that the bat having been continuously wound in the formation of the bale may with facility be unwound and fed into the opening machine of a spinning establishment without the necessity of first tearing up the bale and feeding the cotton into the opening machines by hand, as is now done with cotton supplied to the operator in the ordinary plantation-bales or such bales after compression by the old-style hydraulic compresses. While this winding of the bat is advantageous, however, for the reason stated, it has been found that by reason of the detailed compression hereinbefore defined the cotton or other fibers are more or less injured, the bale is formed with what is known as a "hard center," and the removal of the core-rod upon which the bale is wound is rendered exceedingly difficult, if not impossible. These undesirable characteristics of a cylindrical cotton-bale produced by the method described are due to the detailed compression of the bat, as each layer is tightly compressed upon the layers nearer the center. The truth of this statement will readily appear when it is considered that the innermost layer or convolution of the bale is first subjected to great compression and is thereafter subjected to continued pressure during the entire duration of the baling operation, and as a consequence the completed bale will not be of uniform density throughout and will not have a uniform weight for each unit of volume.

The method pursued in the operation of the Lowry press differs materially from that method which has just been described in that the bale is formed from loose cotton as distinguished from a bat, and while the continued subjection of the innermost portion of the bale to pressure through the baling operation is prevented the cotton is nevertheless compressed in detail, and it is impossible to unwind the bale with that facility which characterizes bales made, as by the Graves method, from a cotton-bat having a width equal to the length of the bale and wound layer upon layer around the core.

The origination of my novel method was induced by the objections urged against the usual methods of making cylindrical bales, the most prominent of these methods and the most essential of their disadvantages appearing in the preceding discussion. Broadly speaking, therefore, the end sought to be attained by me is the production of a cylindrical bale formed from a bat without detail compression in order to preserve the integrity of the fibers, one having uniform density throughout, eliminating the hard center and overcoming the difficulty ordinarily encountered in removing the core, and, finally, a bale which while embodying the desirable characteristics and eliminating the objectionable features mentioned will nevertheless be effectually compressed to a density of from twenty-five to thirty-five pounds per cubic foot for the purpose of producing bales of substantially the size and weight of those now on the market.

In order to enable the invention to be better understood, I have illustrated one form of apparatus which may be employed in practicing the method.

In said drawings, Figure 1 is a perspective view of one form of bale forming and compressing mechanism which may be effectively utilized. Fig. 2 is a longitudinal sectional view of the subject-matter of Fig. 1. Fig. 3 is a similar view showing the parts in the position they assume at the beginning of the baling operation and showing in dotted lines the positions of the parts at the time of the discharge of the compressed bale, and Fig. 4 is a detail view of the mechanism for controlling the movement of the compression-roll.

Like numerals of reference refer to corresponding parts throughout the drawings.

The fundamental feature of my novel method of producing a cylindrical compressed bale involves the formation of a cylindrical bale from a bat without compression in detail and the subsequent compression in bulk of the completed bale. The apparatus therefore involves bale-forming mechanism for winding the bat closely upon the core without material compression, bale-compressing mechanism distinct from the bale-forming mechanism and designed to compress the bale in bulk, and intermediate bale-transferring mechanism capable of transferring the formed bale from the bale-forming mechanism to the compress, and so related to the forming and compressing mechanisms as to permit the formation of one bale simultaneously with the compression of another.

In the illustrated embodiment of the apparatus for practicing the method the entire group of devices is mounted within a single frame 1, located within convenient proximity to the usual condenser 2, from which is received the cotton or other fibrous bat 3. The bale-forming mechanism comprehends upper and lower forming-rolls 4 and 5, between which the bale is designed to be wound upon a core-rod 6. It is usual in the art to form a bale between a pair of compression-rolls capable of separation as the bale increases in size, and the illustrated bale-forming mechanism is of similar nature, the essential difference being that no considerable resistance is opposed to the separation of the rolls 4 and 5, for the reason that it is not desirable to subject the bat to compression in detail during the formation of the bale. The lower forming-roll 5 is suitably mounted in stationary bearings in the opposite sides of the frame 1, and the upper forming-roll 4, disposed directly above the roll 5, is mounted in suitable bearings 7, carried by vertically-movable bearing-blocks 8, movable between guides at opposite sides of the frame, so that the forming-rolls may have relative separative movement to accommodate the gradually-increasing diameter of the bale as it is wound upon the core-rod.

While it is true that the bale is not designed to be compressed in detail during its formation, still slight resistance to the elevation of the vertically-movable forming-roll 4 must be provided to permit said roll to insure the smooth, even, and uniform winding of the bat. For this purpose the weight of the roll may be sufficient; but in order to present a slightly-greater resistance to its elevation and also to prevent its too rapid gravitation when the formed bale is transferred I provide at opposite sides of the frame a pair of vertical screw-rods 9, having threaded engagement with the bearing-blocks 8 and supported in bearings which permit said screw-rods to rotate freely as the blocks 8 are elevated during the formation of the bale or depressed preparatory to the initiation of another bale between the forming-rolls. The screw-rods 9 are geared together for synchronous rotation, as by a sprocket-chain 10, passed around sprocket-wheels 11, carried by the rods 9, and in order to prevent inadvertent backward rotation of the screw-rods one of the latter is provided with a ratchet-wheel 12, controlled in its movement by a pivoted pawl 13. The pawl 13, engaging the ratchet 12, is urged into its engaging position by means of the spring 14 and serves to prevent the gravitation of the upper forming-roll 4 before the operator has had time to place the core-rod in position for the initiation of another bale when the finished bale is transferred to the compress. The spring 14 also performs the function of a light brake, as it exerts more or less pressure tending to prevent the too free rotation of the screw-rods, and thereby causes the upper compression-roll to exert just sufficient pressure upon the bale to insure the proper formation thereof without compression of the bat in detail. In order to maintain the proper position of the bale during its formation, the ends of the core-rod 6 are extended slightly beyond the ends of the bale for the purpose of bringing them into proper position to traverse vertical guides 15, with which the rod is kept in contact by operating the lower roll 5 at slightly greater speed than the roll 4, as will be hereinafter more fully explained.

The operation of the bale-forming mechanism described will be clear to those skilled in the art, inasmuch as the core-rod is placed loosely between the upper and lower rolls in the usual manner, and the end of the cotton-bat having been presented to the rod is gradually wound thereon by means of the motion imparted to the forming-bale by the suitably-driven forming-rolls. The result of this operation will be the production of a complete bale of cylindrical form from a web or bat; but as no considerable resistance is opposed to the recession of the roll 4 the bale will not have been compressed, nor will the fiber be injured or caused to adhere to the core in a manner to render difficult the removal of the rod from the finished bale. The core-rod 6 is now withdrawn from the bale, and the latter is transferred to the compress. In the illustrated embodiment of the apparatus the compressing mechanism comprises a pair of compression-rollers 16 and 17, disposed one above the other and capable of relative separative movement by mounting the upper compression-roller 16 in fixed bearings and the lower compression-roller 17 in suitable bearings supported by vertically-movable bearing-blocks 18, designed to be urged upwardly by powerful pressure applied in any suitable manner.

One form of mechanism for urging the lower compression-roller 17 upwardly toward the fixed compression-roller 16 for the purpose of subjecting the intermediate bale to compression in bulk is illustrated in the drawings and consists in mounting the bearing-blocks 18 of the roller 17 upon the jack-screws 19, fitted with worm-wheels 20, meshing with worms 21, formed upon swinging worm-shafts 22, driven from the power-shaft of a ginnery through the interposition of a driving-shaft 23, flexibly connected to the worm-shafts 22 and equipped with suitable gearing 24, as shown. The worm-shafts 22 are mounted to have lateral movement in order to move the worms 21 into and out of gear with the worm-wheels 20, carried by the jack-screws 19 in order to permit the operator to control the elevation and depression of the lower compression-roller 17. One form of mechanism for controlling the operation of the compressor consists of a suitably-mounted controlling-lever 25, operating a crank-shaft 26, operatively related to a rocker-block 27, suitably supported by the frame of the apparatus and constituting a bearing for the free end of the swinging worm-shafts 22. A similar rocker-block 28 serves for the support of the worm-shaft at the opposite side of the machine and is connected with the crank-shaft 26 by means of a pair of links 29 and 30, connected by an intermediate lever 31, serving to reverse the movements of the links 29 and 30 in order to cause the worms to be simultaneously thrown into and out of engagement with the worm-gears of the jack-screws at opposite sides of the compress.

When the completely-formed uncompressed bale is released from its position between the forming-rolls by the removal of the core-rod and is transferred to the compress, it assumes a position between the compression-rolls 16 and 17, suitably driven to cause the rotation of the bale during its compression in bulk by the gradual upward movement of the lower compression-roller 17. The direction of rotation of the bale under compression is the same as the rotation necessary to effect the winding of the bat upon the core-rod, and as a consequence the slack in a wound bat produced by the compression of the bale will not tend to loosen the fiber, but will be absorbed by the constant tendency of the bat to wind closer as the bale is rapidly rotated between the compression members urged together under pressure increasing as the diameter of the bale is gradually decreased. The position of the bale between the compression-rollers is maintained by a guard or check-roll 32, journaled in suitable bearings and disposed in advance of the compression-rolls and in a plane intermediate thereof. The lower compression-roller 17, like the forming-roll 5, is rotated at a slightly-greater speed than the upper compression-roller 16 to urge the bale constantly in contact with the guard-roll 32, so as to secure the assistance of the latter in effecting the compression of the bale. That step of the method practiced with the aid of the compress is possessed of two important characteristics: First, a wound cylindrical bale is compressed in bulk as distinguished from compression in detail, and, second, the bale during its compression in bulk is rotated in the direction in which the bat is wound. The effect, therefore, of the compression will be to flatten the bale at diametrically opposite points, decreasing the diameter in the direction of pressure by, say, for instance, an inch, while the diameter of the bale transverse or at right angles to the direction of pressure will be increased considerably less than one inch. Consequently the laps of the bat extending between the points of compression are forced to occupy a short space, which causes them to slacken and to bulge or form in waves in advance of the compression-rollers, the slack thus produced being gradually taken up under the influence of the compression and rotary motion of the bale until the latter finally assumes its original cylindrical form and is compressed to the required uniform density throughout.

I am aware that it is not new to subject a rotating bale to compression during the formation thereof, but the step of my method which has just been described is distinguished by the absence of compression in detail—that is to say, that compression of each individual layer of the bat which is highly injurious to the fiber, is omitted, and the distinction therefore is that in the present method the compression in bulk of a completely-formed bale effects a uniform compression of the entire mass of fiber, and the individual fibers are therefore not subjected to that detailed compression which tends at least to destroy their integrity. Furthermore, by reserving the compression of the bale until after its complete formation and removal from the formers the adhesion of the fibers to the core-rod is prevented, and the removal of the latter from the uncompressed bale is attended with no difficulty whatever, and the formation of a bale having a hard closely-packed center is rendered impossible by the fact that at the beginning of the compressing operation the bale is provided with a central opening which relieves the otherwise excessive compression of the fibers constituting the innermost lap or layer of the bat.

The mechanism as thus far described is entirely efficient for carrying out my novel process in its broadest aspect, which comprehends merely the formation of a cylindrical wound bale without compression in detail and the subsequent compression of the bale in bulk. In a somewhat more specific aspect the method contemplates the maintenance of a rotary motion of the bale from its inception to its delivery after compression, and the attainment of this end is made possible by the employment of transfer mechanism for removing the completed bale from the forming mechanism and delivering it to the compressing mechanism or compressor without interrupting the rotary motion imparted to the bale at its inception for the purpose of winding the bat around the core. In the illustrated embodiment of the apparatus the transfer mechanism comprehends a pair of endless belts 33 and 34, passed, respectively, around the roller 16 and roll 5 and around the roller 17 and roll 5. The adjacent or opposed runs of these transfer-belts obviously move in opposite directions, as shown by the arrows in Fig. 2, and hence when the core-rod 6 is withdrawn from the bale the latter will continue to rotate and will be caused to travel toward the compress for the reason that the lower transfer-belt 34 travels at a slightly-higher rate of speed than the upper transfer-belt 33. The movement of the bale is therefore continuous during the winding of the bat and the subsequent transfer of the bale from the forming mechanism to the compressor and during the operation of the compressor to reduce the bale and condense the fibrous structure thereof.

The several rolls and rollers, as well as the belts, may be driven in a variety of ways; but, as shown, the lower forming-roll 5 is operated from a driving-wheel 35, belted to a pulley upon the power-shaft of the gin, and the lower compression-roller 17 is operated from a similar driving-wheel 36, likewise belted to the power-shaft. For the purpose of securing a slightly-greater speed of the lower rolls and belt for the purpose already stated the lower compression-roller 17 will be provided beyond one end thereof with a belt-pulley 37, geared, as by a belt 38, to a somewhat larger pulley 39 at one end of the upper compression-roller 16, the belts 38 and 33 being preferably provided in one run thereof with belt-tighteners 40 and 41, as shown.

In order to give a clearer understanding of the method, the operation of the apparatus may be briefly described as follows: The core-rod 6 having been imposed upon the lower forming-roll 5 or upon the belt passing thereover, the end of the cotton-bat received from the condenser is passed under the rod and the pawl 13 is withdrawn from the ratchet-wheel 12 to permit the backward rotation of the screw-rods 9 and the gravitation of the upper forming-roll 4 into contact with the core-rod. The rotary movement of the forming-rolls will be imparted to the core-rod and the bat will be gradually wound thereon to produce a cylindrical wound bale. During the formation of the bale the ends of the core-rod 6 will travel upwardly along the faces of the guides 15, and the upper forming-roll 4 will gradually recede from the roll 5. When a bale of the desired diameter has been obtained, the core-rod will be withdrawn and the released bale, still rotating in the direction of its winding, will advance along the transfer-belts to a position between the compression-rollers 16 and 17, where it will be checked by the guard-roll 32. The completed bale is now ready to be compressed in bulk, and, if desired, a new bale may now be initiated to render the operation of the apparatus continuous by the formation of one bale during the compression of another.

As soon as the completed bale reaches its position between the compression-rollers the controlling-lever 25 is thrown to proper position to present the worms 21 to the worm-wheels 20 of the jack-screws 19. The rotation of the jack-screws will gradually elevate the lower compression-roller 17, effecting the compression of the bale during its rotation in the manner heretofore described. Assuming that the bale has been sufficiently compressed, the parts being approximately in the position illustrated in Fig. 2, the operator by reversing the lever 25 throws the jack-screws out of gear with their driving mechanism, permitting said screws to rotate freely for the purpose of permitting the gravitation of the lower compression-roller and the discharge of the compressed bale. By this time another bale will have been formed and the apparatus will be in position for a repetition of the operation described.

It should be distinctly understood that the described apparatus is not essential to the carrying out or practice of my method, as it is merely essential that provision be made for forming a wound cylindrical bale without compression in detail and for thereafter reducing the size of the completed bale by compression in bulk, while maintaining the rotation of the bale in the direction in which the bat has been during the winding or formation of the bale.

What I claim is—

1. The method of making cylindrical bales which consists in first forming the bale from a bat without compression in detail, and next applying pressure to the periphery of the bale at two or more separated points, said bale being rotated to present the various portions thereof in the line of compression successively, whereby a compressed bale of cylindrical form is produced.

2. The method of making cylindrical bales which consists in first forming a bale from a bat wound layer upon layer without compression in detail, and in thereafter applying pressure to the bale at two or more separated points, between which the bale rotates in the direction of its winding during the application of pressure thereto, whereby various portions of the bale are successively presented in the line of compression to produce a compressed bale of cylindrical form.

3. The method of making cylindrical bales which consists in first forming a hollow-center bale from a bat wound layer upon layer, without compression in detail, and in thereafter applying pressure to the periphery of the bale at two or more separated points and directed toward the axis thereof, said bale being constantly rotated during the application of pressure whereby various portions of the bale are successively presented in the line of compression to produce a solid compressed bale of cylindrical form, of standard size and weight and having a soft center.

In testimony that I claim the foregoing as my own I have hereto affixed my signature in the presence of two witnesses.

HENRY REMBERT.

Witnesses:
WM. SULLIVAN,
PARTEN WAINWRIGHT.